(12) United States Patent
Kitamura

(10) Patent No.: US 8,334,992 B2
(45) Date of Patent: Dec. 18, 2012

(54) IMAGE FORMATION APPARATUS

(75) Inventor: Mitsuhiro Kitamura, Osaka (JP)

(73) Assignee: Kyocera Document Solutions Inc. (JP)

( * ) Notice: Subject to any disclaimer, the term of this patent is extended or adjusted under 35 U.S.C. 154(b) by 600 days.

(21) Appl. No.: 12/534,327

(22) Filed: Aug. 3, 2009

(65) Prior Publication Data

US 2010/0033751 A1  Feb. 11, 2010

(30) Foreign Application Priority Data

Aug. 5, 2008 (JP) ................. 2008-201760

(51) Int. Cl.
*G06K 15/00* (2006.01)
*H04N 1/40* (2006.01)

(52) U.S. Cl. ...................... 358/1.14; 358/466

(58) Field of Classification Search ............... 358/1.15, 358/1.14, 1.16, 1.18, 468, 446, 466
See application file for complete search history.

(56) References Cited

U.S. PATENT DOCUMENTS

| | | | | |
|---|---|---|---|---|
| 5,752,049 | A * | 5/1998 | Lee .......................... | 713/323 |
| 6,453,145 | B1 * | 9/2002 | Miura ......................... | 399/336 |
| 6,495,979 | B2 * | 12/2002 | Park et al. ...................... | 315/406 |
| 6,741,372 | B1 * | 5/2004 | Murakami ..................... | 358/475 |
| 7,302,195 | B2 * | 11/2007 | Kobayashi ........................ | 399/8 |
| 7,500,119 | B2 * | 3/2009 | Tsai .............................. | 713/300 |
| 7,586,637 | B2 * | 9/2009 | Eastment et al. ............. | 358/1.16 |
| 7,640,441 | B2 * | 12/2009 | Maeda ........................... | 713/300 |
| 7,994,654 | B2 * | 8/2011 | Lee et al. ........................ | 307/39 |
| 8,049,919 | B2 * | 11/2011 | Yoshida ....................... | 358/1.15 |
| 2001/0043353 | A1 * | 11/2001 | Iizuka et al. ................ | 358/1.14 |
| 2002/0070691 | A1 * | 6/2002 | Park et al. ...................... | 315/406 |
| 2004/0125399 | A1 * | 7/2004 | Kobayashi .................... | 358/1.14 |
| 2005/0139591 | A1 * | 6/2005 | Takamatsu et al. ........... | 219/663 |
| 2005/0154934 | A1 * | 7/2005 | Kim ............................... | 713/323 |
| 2005/0179935 | A1 * | 8/2005 | Ogura et al. ................. | 358/1.14 |
| 2005/0232651 | A1 * | 10/2005 | Sato et al. ......................... | 399/88 |
| 2005/0286069 | A1 * | 12/2005 | Eastment et al. ............ | 358/1.14 |
| 2006/0087675 | A1 * | 4/2006 | Terada et al. ................ | 358/1.14 |
| 2006/0265473 | A1 * | 11/2006 | Muto ............................ | 709/218 |
| 2006/0285867 | A1 * | 12/2006 | Takahashi et al. .............. | 399/70 |
| 2007/0143637 | A1 * | 6/2007 | Tsai ............................. | 713/300 |
| 2007/0207765 | A1 * | 9/2007 | Nakahara et al. ........... | 455/343.1 |
| 2007/0217332 | A1 * | 9/2007 | Nakahara ...................... | 370/229 |
| 2007/0240004 | A1 * | 10/2007 | Maeda .......................... | 713/322 |
| 2008/0025305 | A1 * | 1/2008 | Choi ............................. | 370/390 |
| 2008/0229132 | A1 * | 9/2008 | Suga et al. .................... | 713/324 |
| 2008/0231878 | A1 * | 9/2008 | Yano et al. ................... | 358/1.13 |
| 2009/0109485 | A1 * | 4/2009 | Yoshida ....................... | 358/1.15 |
| 2009/0282278 | A1 * | 11/2009 | Satoh .......................... | 713/321 |
| 2009/0300380 | A1 * | 12/2009 | Vojak et al. ................... | 713/310 |
| 2010/0164284 | A1 * | 7/2010 | Lee et al. ......................... | 307/38 |
| 2011/0026667 | A1 * | 2/2011 | Poorter .......................... | 378/12 |

FOREIGN PATENT DOCUMENTS

| | | |
|---|---|---|
| JP | 10-143025 | 5/1998 |
| JP | 11-126000 | 5/1999 |
| JP | 2000-261582 | 9/2000 |
| JP | 2003-263075 | 9/2003 |
| JP | 2004-333956 | 11/2004 |

* cited by examiner

*Primary Examiner* — Jerome Grant, II
(74) *Attorney, Agent, or Firm* — Ostrolenk Faber LLP

(57) ABSTRACT

An image formation apparatus including: a state indicator which informs of a current system state to an outside; a system state manager which manages the system state; and an alert controller which controls the state indicator according to the system state identified by the system state manager, wherein if the system state manager identifies that the system state is in a power off inhibition state, the alert controller causes the state indicator to inform a user of the power off inhibition state.

16 Claims, 4 Drawing Sheets

IMAGE FORMATION APPARATUS

BACKGROUND OF THE INVENTION

1. Field of the Invention

The present invention relates to an image formation apparatus such as a copy machine, a multifunction peripheral and the like.

Priority is claimed on Japanese Patent Application No. 2008-201760, filed Aug. 5, 2008, the content of which are incorporated herein by reference.

2. Description of Related Art

It is common for a conventional image formation apparatus, such as a copy machine, a multifunction peripheral or the like, to have a function of transition from a system state to a power saving state when a power key is manipulated or the apparatus remains unused for a period of time exceeding a set value in order to reduce power consumption in an unused state. In many cases, such an image formation apparatus is equipped with a state indicator such as an LED in order to provide information about the current system state.

However, with recent advances in multifunction image formation apparatuses, in many cases, one multifunction peripheral has a plurality of functional parts such as a copy machine, a printer, a facsimile, a scanner or the like, and a mass storage medium such as HDD or the like. Accordingly, when a system state is transitioned into a power saving state, the functional parts or HDD each have to be changed to the power saving state, which requires a certain period of time until the system state is completely transitioned into the power saving state.

Until the system state is completely transitioned into the power saving state, a state where power off is not allowed (power off inhibition state) is internally set. However, conventional arts have not included any method to cause the user to notice the transition of the system state into the power saving state.

In consideration of the above circumstances, it is an object of the present invention to provide an image formation apparatus which is capable of preventing a power off operation by a user when the system state is in a power off inhibition state.

SUMMARY OF THE INVENTION

To achieve the above object, the present invention employs the followings.

As a first aspect related to the image formation apparatus, there is provided an image formation apparatus including: a state indicator which informs of a current system state to an outside; a system state manager which manages the system state; and an alert controller which controls the state indicator according to the system state identified by the system state manager, wherein if the system state manager identifies that the system state is in a power off inhibition state, the alert controller causes the state indicator to inform a user of the power off inhibition state.

DETAILED DESCRIPTION OF THE INVENTION

Hereinafter, an embodiment of the present invention will be described with reference to the accompanying drawings. In the following description, an image formation apparatus related to the present invention is illustrated by a multifunction peripheral into which the functions of a copier, a printer, a facsimile, a scanner and the like are integrally incorporated.

Figure 1:
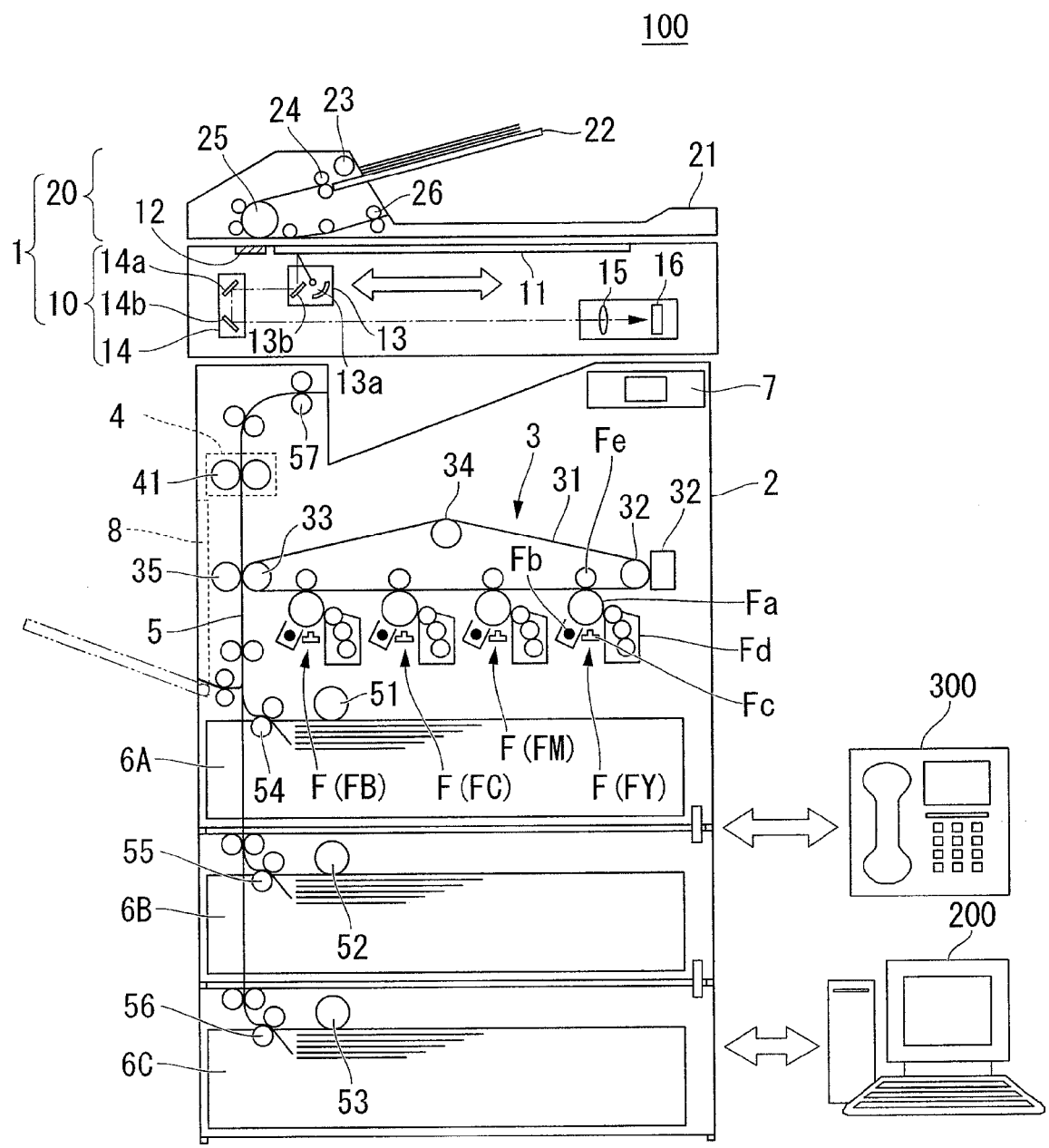
FIG. 1 is a schematic view showing a configuration of a multifunction peripheral 100 (image formation apparatus) according to an embodiment of the present invention.

FIG. 1 is a schematic view showing a configuration of a multifunction peripheral 100 according to this embodiment. As shown in FIG. 1, the multifunction peripheral 100 includes at least a document scanner 1 having a function of scanning a document (function as a scanner), and a main body 2. The main body 2 has at least the following functions: a function of forming an image on a recording sheet based on the image data of a document scanned by the document scanner 1 (a function as a copier); a function of forming an image on a recording sheet based on the print image data received from an external personal computer (PC) 200 via a communication link (a function as a printer); and a function of forming an image on a recording sheet based on FAX image data received from an external facsimile 300 via a communication link and transmitting the image data of a document scanned by the document scanner 1 to the facsimile 300 as FAX image data (a function as a facsimile).

The document scanner 1 includes a flat bed scanner 10 and an auto document feeder (ADF) 20. The flat bed scanner 10 scans a document set on platen glass 11 or a document automatically fed by the ADF 20. The flat bed scanner 10 includes the platen glass 11, a white reference plate 12, a full rate carriage 13, a half rate carriage 14, a condensing lens 15, a charge-coupled device (CCD) sensor 16, etc.

The platen glass 11 is a glass plate on which documents to be scanned are set one by one. The white reference plate 12 is a white plate used to acquire white reference data for shading correction. The full rate carriage 13 is provided below the platen glass 11 so as to be reciprocally movable in the left and right direction (scanning direction) along the platen glass 11 by a carriage carrying mechanism (not shown in the figures). The full rate carriage 13 contains a lamp 13a which emits illumination light obliquely and upward and a first mirror 13b which reflects the reflection light of the illumination light toward the half rate carriage 14 which will be described below.

The half rate carriage 14 is provided so as to be reciprocally movable in the left and right direction (scanning direction) along the platen glass 11 by the carriage carrying mechanism, like the full rate carriage 13. The half rate carriage 14 contains a second mirror 14a which reflects light incident from the first mirror 13b of the full rate carriage 13 downward, and a third mirror 14b which reflects light incident from the second mirror 14a toward the condensing lens 15 which will be described later. In addition, the ratio of the movement amount of the full rate carriage 13 to the movement amount of the half rate carriage 14 is controlled to be 1:0.5 by the carriage carrying mechanism. With this control, the length of the optical path of the illumination light up to the condensing lens 15 becomes constant.

When a document set on the platen glass 11 is scanned, the document is scanned by moving the full rate carriage 13 and the half rate carriage 14 in the scanning direction. On the other hand, when a document is automatically fed by the ADF 20, which will be described later, the full rate carriage 13 and the half rate carriage 14 wait at predetermined document scanning positions and the document is scanned by moving (carrying) the document side.

The condensing lens 15 condenses light incident from the third mirror 14b of the half rate carriage 14 in order to form an image on a light receiving surface of the CCD sensor 16. The CCD sensor 16 operates in synchronization with a timing signal supplied from a CCD controller (not shown). The CCD sensor 16 generates an analog voltage signal according to the image of the scanned document by converting the light received on the light receiving surface into an electrical signal. This analog voltage signal is output to an analog front end (AFE) (not shown). After amplifying the analog voltage signal with a predetermined gain setting value, the AFE generates image data for the scanned document by converting the amplified analog voltage signal into a digital signal. The image data is stored in an image data memory (not shown) of the main body 2.

The ADF 20 automatically feeds a plurality of documents set on a document loading tray 22 one by one. The ADF 20 includes a platen cover 21, the document loading tray 22, a pickup roller 23, a registration roller 24, a platen roller 25, a paper ejection roller 26, etc.

The platen cover 21 is provided so as to be opened and closed with respect to the flat bed scanner 10 (platen glass 11). The platen cover 21 plays at least the role of a document pressing cover when a document is set and scanned on the platen glass 11 and the role of housing to accommodate automatic feeding mechanisms such as the pickup roller 23, the registration roller 24, the platen roller 25 and the paper ejection roller 26. FIG. 1 shows the closed state of the platen cover 21.

The document loading tray 22 is a tray on which documents to be scanned are set. The pickup roller 23 picks up documents set on the document loading tray 22 one by one and transfers them to the registration roller 24. The registration roller 24 transfers the documents to the platen roller 25 at a predetermined timing. The platen roller 25 transfers the documents to the paper ejection roller 26 via a predetermined document scanning position. The paper ejection roller 26 ejects the scanned documents externally.

The main body 2 includes at least the following elements: an image formation part 3 which forms an image on a recording sheet based on image data of the document scanned by the document scanner 1, print image data received from the PC 200, or FAX image data received from the facsimile 300; a fixing part 4 which fixes the image (toner image) formed on the recording sheet by the image formation part 3; a carrying path 5 along which the recording sheet is carried via the image formation part 3 and the fixing part 4; paper feed cassettes 6A, 6B and 6C on which recording sheets of different sizes are loaded; and an operation display part 7 as a user interface, which displays the setting contents and receives setting operations from the user. In addition, the main body 2 is provided with an input tray 8, which can be opened toward the user and closed The main body 2 is configured such that recording sheets loaded on the input tray 8 can be linked to the carrying path 5.

The image formation part 3 includes at least the following elements: an intermediate transfer belt 31; a cleaner 32; image formation units F (FY, FM, FC, FB) corresponding respectively to the colors of yellow (Y), magenta (M), cyan (C) and black (BK); a driving roller 33; a tension roller 34; and a secondary transfer roller 35. The intermediate transfer belt 31 is an intermediate transfer body which primarily transfers toner images formed by the image formation units F (FY, FM, FC, FB). The intermediate transfer belt 31 is suspended by the driving roller 33 and the tension roller 34 and turns clockwise in FIG. 1. The cleaner 32 includes a cleaning roller, a cleaning blade, etc. to remove toners remaining in the intermediate transfer belt 31.

The image formation units F (FY, FM, FC, FB) each include at least a photoconducting drum Fa, a charging unit Fb, an exposing unit Fc, a developing unit Fd, a primary transfer roller Fe, a cleaning unit (not shown), a de-electrifying unit (not shown), etc. The photoconducting drum Fa is of a cylindrical shape and has an electrostatic latent image and a toner image based on the electrostatic latent image, which are formed on its circumference. The charging unit Fb is disposed opposite to the photoconducting drum Fa and electrifies the circumference of the photoconducting drum Fa. The exposing unit Fc scans the electrified circumference of the photoconducting drum Fa with laser light emitted based on image data. The developing unit Fd develops the image based on the electrostatic latent image on the circumference of the photoconducting drum Fa by supplying toner to the circumference of the photoconducting drum Fa.

The primary transfer roller Fe is disposed opposite to the photoconducting drum Fa with the intermediate transfer belt 31 interposed therebeween and primarily transfers the image (toner image) developed on the photoconducting drum Fa onto the intermediate transfer belt 31. The secondary transfer roller 35 is disposed opposite to the driving roller 33 with the intermediate transfer belt 31 interposed therebeween. The secondary transfer roller 35 secondarily transfers the toner image formed on a surface of the intermediate transfer belt 31 onto a recording sheet carried via the carrying path 5 from one of the paper feed cassettes 6A, 6B and 6C. The fixing part 4 fixes the toner image secondarily transferred onto the recording sheet. The fixing part 4 includes a heating roller 41 which fixes the toner by pressurizing and heating the toner.

Along the carrying path 5 are provided at least the following elements: pickup rollers 51, 52 and 53 which carry out recording sheets from the paper feed cassettes 6A, 6B and 6C; paper feed rollers 54, 55 and 56 which propel the picked recording sheets along the carrying path 5 passing between the driving roller 33 and the secondary transfer roller 35 of the image formation part 3; and a paper ejection roller 57 which ejects recording sheets externally after fixing. The paper feed cassettes 6A, 6B and 6C can be freely drawn out of the main body 2 and receive recording sheets of different sizes.

Figure 2:
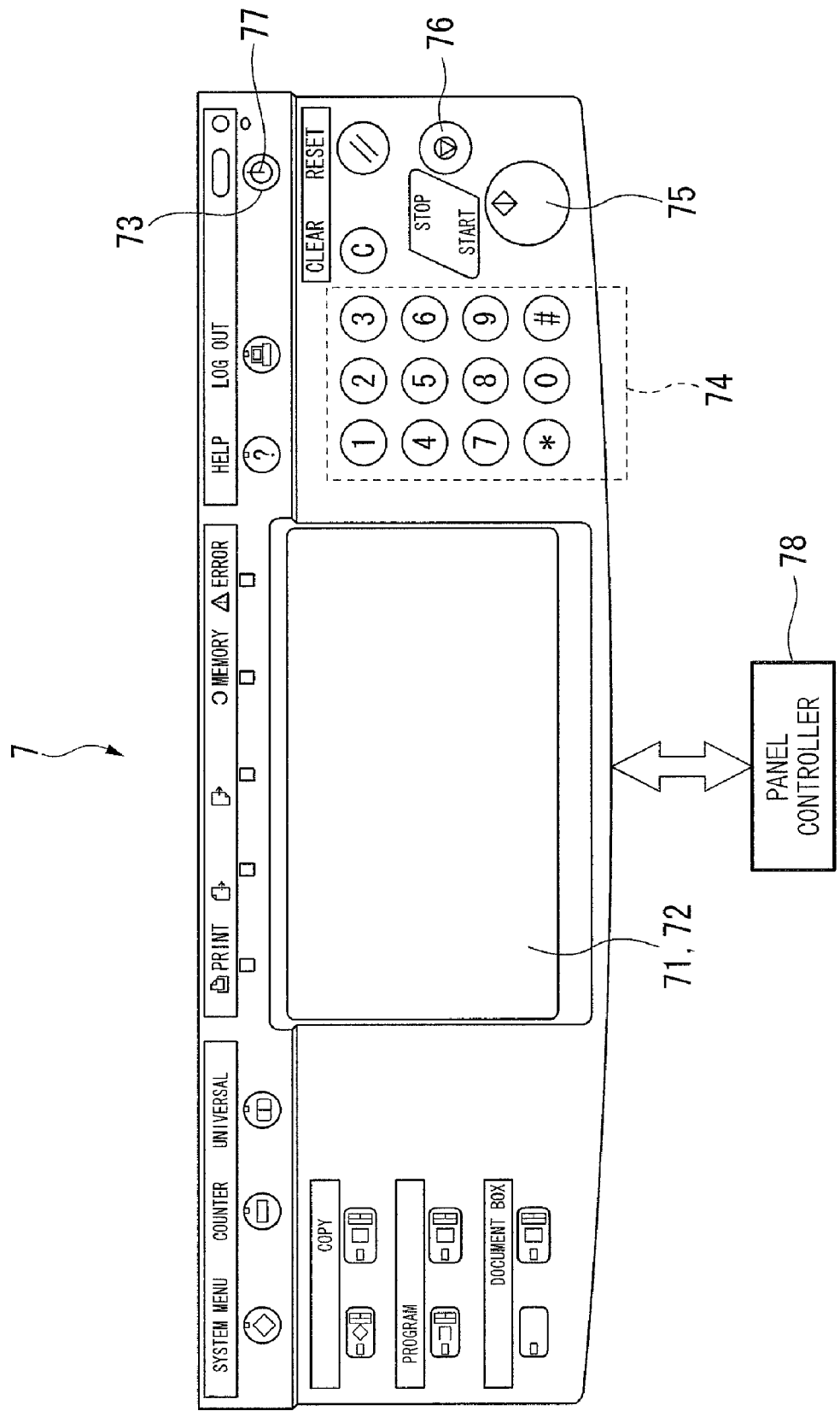
FIG. 2 is a schematic view showing a configuration of an operation display part 7 in the multifunction peripheral 100 according to the embodiment of the present invention.

The operation display part 7 includes at least the following elements: a touch panel 71; a liquid crystal panel 72; various operation keys such as a power key 73, a numeric keypad 74, a copy start key 75, a copy stop key 76 and the like; a LED 77; and a panel controller 78, as shown in FIG. 2.

The touch panel 71 is a touch panel employing a type of analog resistive film type to detect the coordinates of sites pressed by a user. The touch panel 71 outputs a pressed coordinate signal, representing the X coordinate and Y coordinate of a pressed site, to the panel controller 78. The type of analog resistive film is known in the art and therefore the details thereof will be omitted. The liquid crystal panel 72 is disposed immediately below the touch panel 71 and displays a predetermined screen under the control of the panel controller 78.

Various operation keys such as the power key 73, the numeric keypad 74, the copy start key 75, the copy stop key 76 and the like output operation signals according to their respective operation inputs to the panel controller 78. The LED 77 is equipped within the power key 73 and is a light emitting diode turned on/off by the panel controller 78. The LED 77 plays the role of a state indicator which informs of the system state of the multifunction peripheral 100.

The panel controller 78 determines what operation is performed by a user based on the following signals: a pressed coordinate signal input from the touch panel 71; and operation signals input from various operation keys such as the power key 73, the numeric keypad 74, the copy start key 75, the copy stop key 76 and the like. The panel controller 78 informs a main controller 9 (see FIG. 3) of the result of the determination. In addition, the panel controller 78 controls the display screen of the liquid crystal panel 72 or the turning on/off of the LED 77 depending on the system state of the multifunction peripheral 100 which is informed from the main controller 9.

Figure 3:
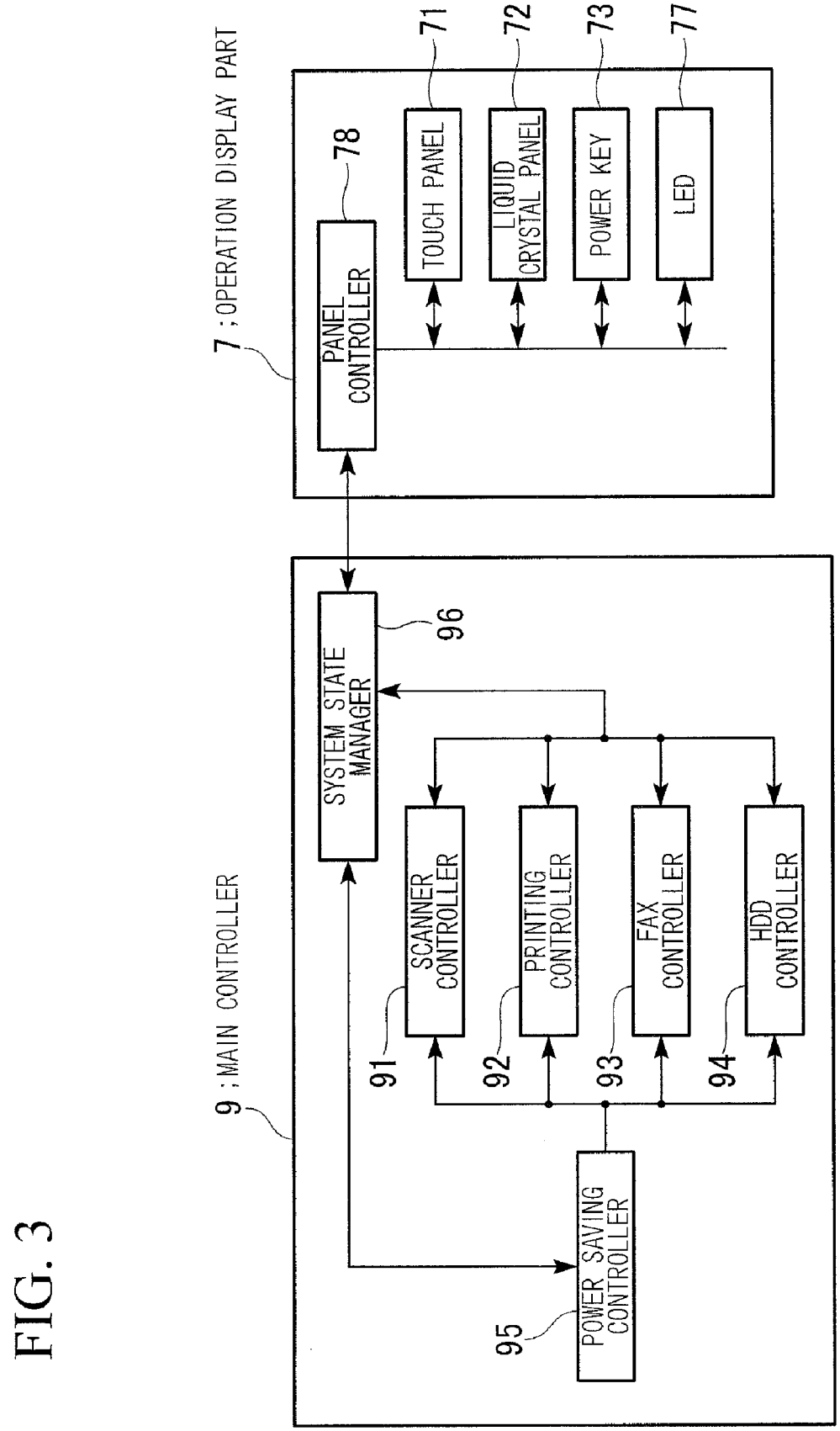
FIG. 3 is a functional block diagram of a main controller 9 in the multifunction peripheral 100 according to the embodiment of the present invention.

The main controller 9 generally controls the entire operation of the multifunction peripheral 100. As shown in FIG. 3, the main controller 9 includes at least a scanner controller 91, a printing controller 92, a FAX controller 93, a HDD controller 94, a power saving controller 95 and a system state manager 96.

The scanner controller 91 generates the image data of a scanned document by controlling the document scanning operation of the document scanner 1. The printing controller 92 controls the image formation operation of the image formation part 3 and the fixing part 4. The printing controller 92 forms an image on a recording sheet based on the document image data generated by the document scanner 1, the print image data received from the PC 200, and the FAX image data received from the facsimile 300. The FAX controller 93 controls a FAX image data transmission/receipt operation with the facsimile 300, which is a communication counterpart. The HDD controller 94 controls the data writing and reading operations of a hard disk drive (HDD) (not shown).

The power saving controller 95 controls the transition of the system state of the multifunction peripheral 100 into the power saving state and the return from the power saving state. In this embodiment, the power saving controller 95 controls the transition into the power saving state and returns from the power saving state for each of the scanner controller 91, the printing controller 92, the FAX controller 93 and the HDD controller 94. The system state manager 96 manages the system state of the multifunction peripheral 100 based on the result of the operation determination informed from the panel controller 78 of the operation display part 7 and informs the panel controller 78 of the system state which is currently identified.

Specifically, for example, when an operation determination result indicating pressing of the copy start key 75 is received from the panel controller 78, the system state manager 96 instructs the scanner controller 91 and the printing controller 92 to start a copy operation. As another example, when an operation determination result indicating pressing of the power key 73 is received, the system state manager 96 instructs the power saving controller 95 to start the control of the transition into the power saving state.

Figure 4:
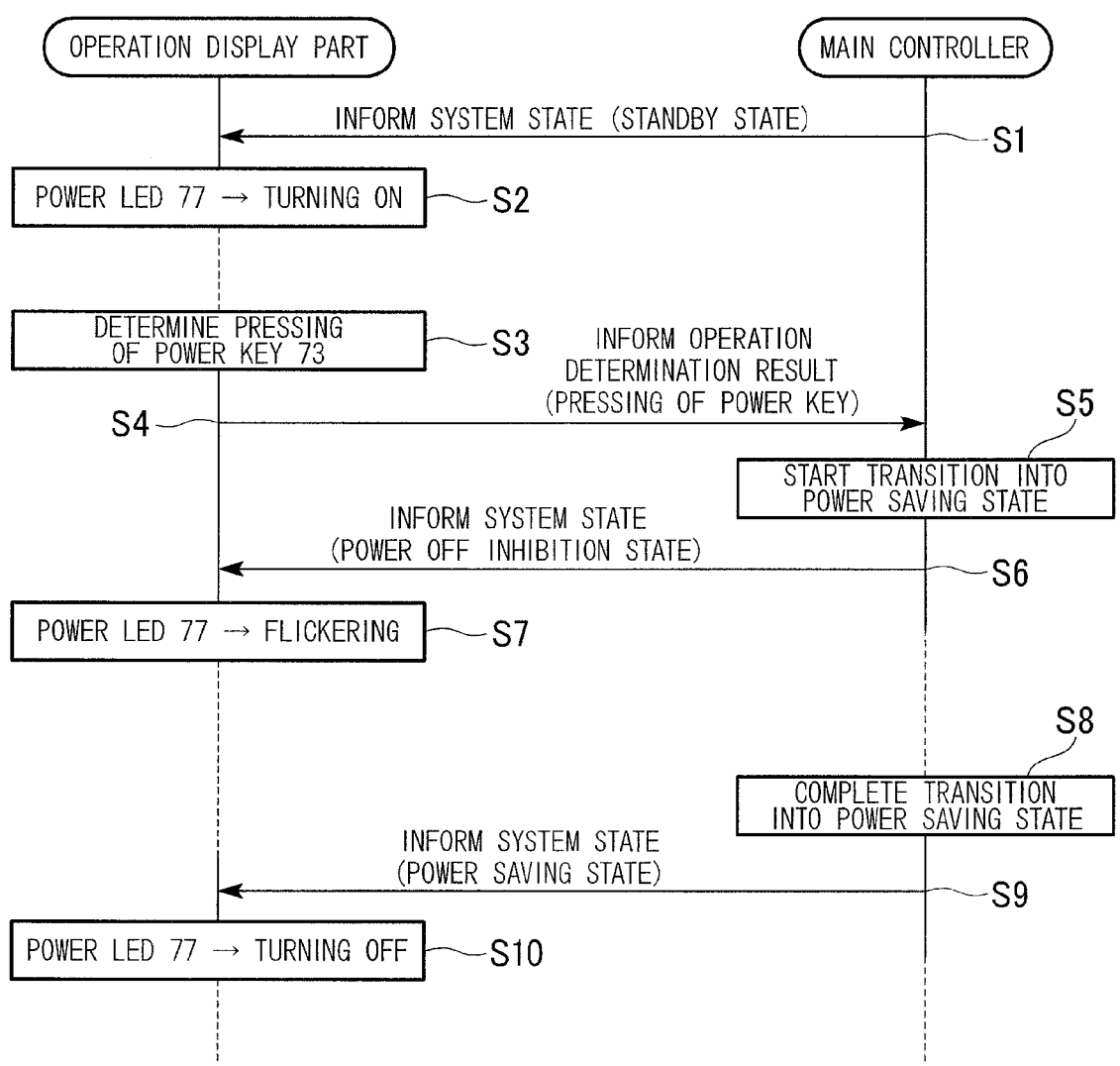
FIG. 4 is a sequence chart showing an operation of a main controller 9 and an operation display part 7 when the system state of the multifunction peripheral 100 is transitioned to a power saving state according to the embodiment of the present invention.

Next, an operation of the above-configured multifunction peripheral 100, particularly the operation of the main controller 9 and the operation display part 7 when the system state is transitioned into the power saving state, will be described with reference to a sequence chart in FIG. 4. In FIG. 4, it is assumed that the initial system state is a standby state (a state in which the system is ready to function upon receiving a user operation, according to the user operation).

In this case, first, the system state manager 96 of the main controller 9 informs the panel controller 78 of the operation display part 7 that the current system state is in a standby state (Process S1). Upon being informed of the fact that the system state is in the standby state, the panel controller 78 turns on the LED 77 (Process S2). Accordingly, from the turning on of the LED 77, a user can recognize that the current system state of the multifunction peripheral 100 is in the standby state.

When a user presses down the power key 73 at a certain time, the panel controller 78 determines that the power key 73 is pressed down, based on an operation signal output from the power key 73 (Process S3), and informs the system state manager 96 of the result of this operation determination (Process S4).

Upon being informed of the operation determination result indicating that the power key 73 is pressed down, the system state manager 96 instructs the power saving controller 95 to start the control of the transition into the power saving state. Accordingly, the power saving controller 95 starts the control of the transition into the power saving state for each of the scanner controller 91, the printing controller 92, the FAX controller 93 and the HDD controller 94 (Process S5).

At this time, the power saving controller 95 informs the system state manager 96 of the transition into the power saving state. The system state manager 96 identifies (i.e., defines) that the system state in the period of time during the transition into the power saving state is in a power off inhibition state, and informs the panel controller 78 that the current system state is in the power off inhibition state (Process S6).

Upon being informed of the fact that the system state is in the power off inhibition state, the panel controller 78 causes the LED 77 (Process S7) to flicker. That is, from the flickering of the LED 77, a user can recognize that the current system state of the multifunction peripheral 100 is in the power off inhibition state.

After a certain period of time elapses, the transition into the power saving state of the scanner controller 91, the printing controller 92, the FAX controller 93 and the HDD controller 94 is completed (Process S9). At this time, the power saving controller 95 informs the system state manager 96 that the transition into the power saving state is completed. At this time, the system state manager 96 identifies that the current system state is in the power saving state, and informs the panel controller 78 that the current system state is in the power saving state (Process S9).

Upon being informed of the fact that the system state is in the power saving state, the panel controller 78 turns off the LED 77 (Process S10). That is, from the turning off of the LED 77, a user can recognize that the current system state of the multifunction peripheral 100 is in the power saving state.

In this manner, according to this embodiment, the system state during a period of time from the start of the transition into the power saving state to the completion of the transition is identified as the power off inhibition state, and the LED 77 is made to flicker so as to inform of this information. Accordingly, a user can recognize that the current system state of the multifunction peripheral 100 is in the power off inhibition state. As a result, a power off operation by the user during the power off inhibition state is prevented, thereby making it possible to prevent faults in the hardware such as the various functional parts, the HDD and the like of the multifunction peripheral 100.

The present invention is not limited to the above embodiment, but modifications thereof may be employed.

(1) In the above embodiment, the system state during the period of time from the start of transition of the standby state into the power saving state to the completion of the transition is identified to be the power off inhibition state, and the LED 77 was made to flicker to inform of this information. However, the system may be configured so that the system state during the period of time from the start of the return from the power saving state to the standby state to the completion of the return is identified to be the power off inhibition state, and the LED 77 may be made to flicker. Even during the period of time from the start of return from the power saving state to the completion of the return, if the power is turned off by a user, the power off may cause faults in each of the functional parts, or the HDD and the like of the multifunction peripheral 100.

(2) In the above embodiment, it has been illustrated that the period of time during which the system state is transitioned from the standby state into the power saving state or the period of time during which the system state is returned from the power saving state to the standby state is identified as the power off inhibition state. However, for example, the system state during the period of time of a copy operation, a FAX transmission, a printing operation or the like may be identified as the power off inhibition state. Even during the period of time of a copy operation, a FAX transmission, a printing operation or the like, if the power is turned off by a user, the power off may cause faults in the various functional parts, the HDD and the like of the multifunction peripheral 100.

(3) In the above embodiment, it has been illustrated that the control of the transition into the power saving state is performed when the power key 73 is pressed down. However, for example, it may be configured such that a timer (time measurement member) which measures the period in which the multifunction peripheral 100 is unused is provided within the power saving controller 95 or the system state manager 96. The control of the transition into the power saving state may be performed if the period the apparatus is unused exceeds a predetermined value.

(4) In the above embodiment, it has been illustrated that the LED 77 is provided as the state alerting part. However, the state indicator may be sufficient as long as it can inform of the system state. For example, it may be configured such that the sound of a buzzer (sound producing member) or the like informs of the system state, or that a message panel to indicate the system state is displayed on the liquid crystal panel 72. Furthermore, although the image formation apparatus has been illustrated by the multifunction peripheral 100 in the above embodiment, the present invention is not limited thereto, but may be applied to image formation apparatuses such as copy machines, printers, facsimiles, and other image formation apparatuses.

The present invention exemplified by the aforementioned embodiments may be summarized as follows.

As a first aspect related to the image formation apparatus, there is provided an image formation apparatus including: a state indicator which informs of a current system state an outside; a system state manager which manages the system state; and an alert controller which controls the state indicator according to the system state identified by the system state manager, wherein if the system state manager identifies that the system state is in a power off inhibition state, the alert controller causes the state indicator to inform a user of the power off inhibition state.

As a second aspect related to the image formation apparatus, in addition to the first aspect, the image formation apparatus may further include a power saving controller which controls a transition of the system state into a power saving state, and a resume of the system state from the power saving state, wherein the system state manager identifies that the system state during the period of time from the start of the transition into the power saving state by the power saving controller to the completion of the transition is the power off inhibition state.

As a third aspect related to the image formation apparatus, in addition to the second aspect, the image formation apparatus may further include a time measurement member which measures the duration in which the image formation apparatus is unused, wherein when the duration measured by the time measurement member exceeds a predetermined amount of time, a transition into the power saving state is performed.

As a fourth aspect related to the image formation apparatus, in addition to the second aspect, the system state manager may identify that the system state during a period of time from the start of the return from the power saving state by the power saving controller to the completion of the return is the power off inhibition state.

As a fifth aspect related to the image formation apparatus, in addition to the first aspect, the state indicator may include a light emitting member; and when the system state manager identifies that the system state is in the power off inhibition state, the alert controller causes the light emitting member to flicker.

As a sixth aspect related to the image formation apparatus, in addition to the first aspect, the state indicator may include a sound producing member; and when the system state manager identifies that the system state is in the power off inhibition state, the alert controller causes the sound producing member to produce a sound.

As a seventh aspect related to the image formation apparatus, in addition to the first aspect, the state indicator may include a display member; and when the system state manager identifies that the system state is in the power off inhibition state, the alert controller causes the display member to display the system state.

As a eighth aspect related to the image formation apparatus, in addition to the first aspect, the image formation apparatus may further include a print output part, wherein the system state manager identifies that the system state is in the power off inhibition state during the operation of the print output part.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An image formation apparatus comprising:
   a state indicator which informs of a current system state to an outside;
   a system state manager which manages the system state; and
   an alert controller which controls the state indicator according to the system state identified by the system state manager, wherein
   if the system state manager identifies that the system state is in at least one power off inhibition state, the alert controller causes the state indicator to inform a user of the at least one power off inhibition state.

2. The image formation apparatus according to claim 1, further comprising a power saving controller which controls a transition of the system state into a power saving state, and a resume of the system state from the power saving state, wherein the system state manager identifies that the system state during the period of time from the start of the transition into the power saving state by the power saving controller to the completion of the transition is a power off inhibition state.

3. The image formation apparatus according to claim 2, further comprising a time measurement member which measures the duration in which the image formation apparatus is unused, wherein when the duration measured by the time measurement member exceeds a predetermined amount of time, a transition into the power saving state is performed.

4. The image formation apparatus according to claim 2, wherein the system state manager identifies that the system state during a period of time from the start of the resume from the power saving state by the power saving controller to the completion of the return is a power off inhibition state.

5. The image formation apparatus according to claim 1, wherein:

the state indicator includes a light emitting member; and when the system state manager identifies that the system state is in the at least one power off inhibition state, the alert controller causes the light emitting member to flicker.

6. The image formation apparatus according to claim 1, wherein:

the state indicator includes a sound producing member; and when the system state manager identifies that the system state is in the at least one power off inhibition state, the alert controller causes the sound producing member to produce a sound.

7. The image formation apparatus according to claim 1, wherein:

the state indicator includes a display member; and when the system state manager identifies that the system state is in the at least one power off inhibition state, the alert controller causes the display member to display the system state.

8. The image formation apparatus according to claim 1, further comprising a print output part, wherein the system state manager identifies that the system state is in the at least one power off inhibition state during the operation of the print output part.

9. An image formation apparatus comprising:

a state indicator which informs of a current system state to a user;

a system state manager which manages the system state;

a power saving controller which controls a change of the system state into a power saving state, and a return of the system state from the power saving state; and an alert controller which controls the state indicator according to the system state identified by the system state manager, wherein if the system state manager identifies that the system state is changing into the power saving state, during a period of time from a start of the change into the power saving state to a completion of the change, the alert controller controls the state indicator to inform a user of the change, or if the system state manager identifies that the system state is returning from the power saving state, during a period of time from a start of the return from the power saving state to a completion of the return, the alert controller controls the state indicator to inform a user of the return.

10. The image formation apparatus according to claim 9, further comprising a time measurement member which measures the duration in which the image formation apparatus is unused, wherein when the duration measured by the time measurement member exceeds a predetermined amount of time, a change into the power saving state is performed.

11. The image formation apparatus according to claim 9, wherein:

the state indicator includes a light emitting member; and when the system state manager identifies that the system state is changing into the power saving state or returning from the power saving state, the alert controller causes the light emitting member to flicker.

12. The image formation apparatus according to claim 9, wherein:

the state indicator includes a sound producing member; and when the system state manager identifies that the system state is changing into the power saving state or returning from the power saving state, the alert controller causes the sound producing member to produce a sound.

13. The image formation apparatus according to claim 9, wherein:

the state indicator includes a display member; and when the system state manager identifies that the system state is changing into the power saving state or returning from the power saving state, the alert controller causes the display member to display the system state.

14. The image formation apparatus according to claim 9, further comprising a print output part, wherein the system state manager identifies that the system state is changing into the power saving state or returning from the power saving state during the operation of the print output part.

15. The image formation apparatus according to claim 9, wherein the state indicator is included in a power key.

16. An image formation apparatus comprising:

a state indicator which is included in a power key and informs of a current system state to a user;

a system state manager which manages the system state; and an alert controller which controls the state indicator according to the system state identified by the system state manager, wherein if the system state manager identifies that the system state is a power off inhibition state, the alert controller controls the state indicator to inform a user of the power off inhibition state.

* * * * *